Nov. 21, 1933.      G. A. MONTGOMERY      1,936,139
ROTARY DRIVE BUSHING
Filed June 26, 1931      2 Sheets-Sheet 1

GUSTAVUS. A. MONTGOMERY.
INVENTOR.

BY *Munn & Co*
ATTORNEYS.

Nov. 21, 1933.    G. A. MONTGOMERY    1,936,139
ROTARY DRIVE BUSHING
Filed June 26, 1931    2 Sheets-Sheet 2
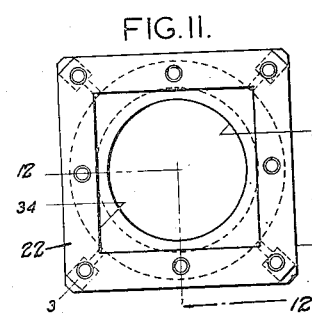
FIG.11.
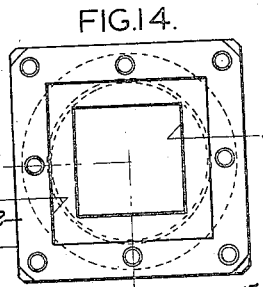
FIG.14.
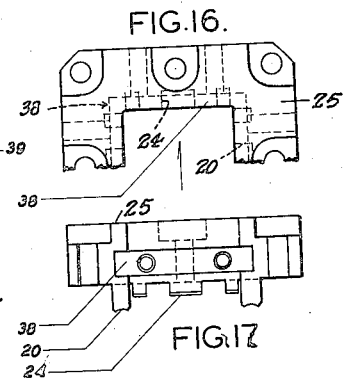
FIG.16.
FIG.17.
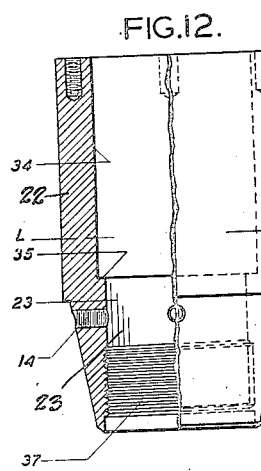
FIG.12.
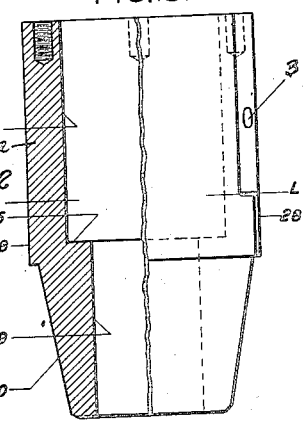
FIG.15.
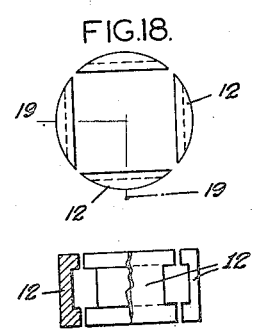
FIG.18.
FIG.19.
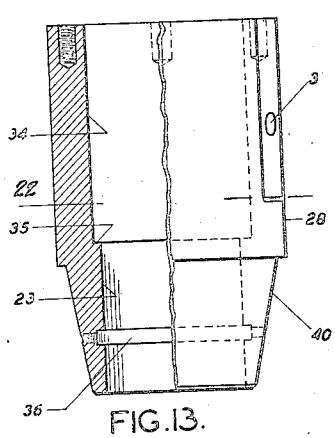
FIG.13.
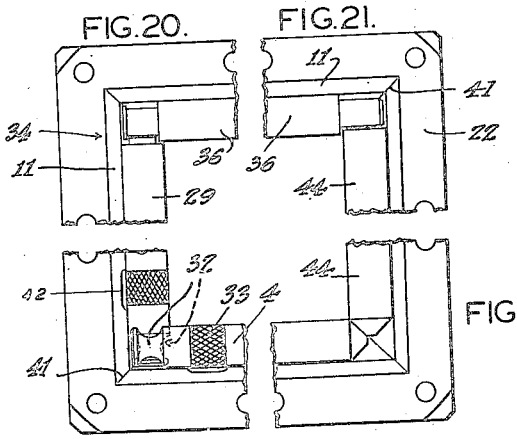
FIG.20. FIG.21.
FIG.22. FIG.23.
GUSTAVUS. A. MONTGOMERY.
INVENTOR.
BY
ATTORNEYS.

Patented Nov. 21, 1933

1,936,139

UNITED STATES PATENT OFFICE 1,936,139

ROTARY DRIVE BUSHING

Gustavus A. Montgomery, Dallas, Tex.

Application June 26, 1931. Serial No. 546,953

27 Claims. (Cl. 255—23)

This invention relates to new and useful improvements in oil well boring machinery, and in particular to that part of said machinery known as rotary drive bushing, of which the following is a clear, and exact description such as will enable others, skilled in designing and producing rotary drilling machinery, to design and reduce it to practice; and those, who in the nature of their calling, use rotary drilling machinery, will be enabled to make full use of this invention.

Rotary drilling machines are made in a large variety of designs, but most of them conform closely in their method of rotating the drill stem to the following practices:

The rotary table has a central opening, adapted to receive and rotate a bushing the interior of which is formed to fit and impart its rotative movement to what is known as a grief bar which in this instance is of a square cross-section. The upper end of this grief bar is connected to a swivel by suitable couplings, and the swivel, in turn, is carried by a casing hook. To the lower end of the grief bar is attached by suitable couplings the drill pipe that has attached to its lower end a suitable boring tool. The square grief bar has a free sliding fit for vertical movement in the plain axial rectangular bore of the old type drive bushing, the usual square driving portion of which does not extend above what is known as the master bushing which, in practice, comes approximately to the line L—L of the various figures. The rate of down feed of the grief bar is controlled by allowing part or all of the drill stem and grief bar weight to bear down on the boring tool in the lower end of the drill pipe.

In drilling, it frequently happens that the torque transmitted by the rotary is so great that the friction between the grief bar and the plain bushing walls will not permit the grief bar to slide freely through the drive bushing, thus preventing a uniform rate of down feed. This results in excessive stresses in the drill pipe, the drilling lines, the draw works, and particularly hinders taking cores. To assure continuously sensitive downward feeding of the boring tool, it is necessary to provide anti-friction means between the grief bar and bore of the drive bushing, and it is for that and other useful purposes, the present invention is brought forth.

The important objects of the present invention are:—

To provide a simple and efficient drive bushing wherein the friction between the drive bushing and the sides of the grief bar is reduced to a minimum.

To provide a drive bushing wherein parts, which are subjected to accentuated local wear, may be easily and inexpensively replaced without discarding the whole bushing, said parts which are subject to the most rapid wear being hardened, it being impractical and undesirable to thus harden the whole bushing.

A further object is to prolong the endurance and increase the efficiency of the anti-friction mechanism by providing means to lubricate said anti-friction mechanism and to provide means to retain the lubricant within the drive bushing including wipers that clean the grief bar as it slips up and down within the bushing.

A further object is to provide a solid cast drive bushing body which, by virtue of an oversized bore later described, can be mounted on a grief bar which has its connecting collars screwed or welded on permanently.

A further object is to provide a drive bushing adapted to receive various sizes of anti-friction assemblages, enabling the use of one drive bushing body for several sizes of grief bars.

A further object is to provide a new type of anti-friction rollers wherein the rollers themselves act as spacers and retainers, and embody a formation which provides gripping means between the rollers and grief bar.

A further object is to protect the anti-friction means from blows from the grief bar couplings on either end of the grief bar and to reduce to a minimum the danger of gas ignition by sparks when the drive bushing is hit by either grief bar collar, by making the split guide sleeve (Fig. 6) and top bonnet (Fig. 16) of brass or other non-spark producing metal.

Various additional objects and advantages of my invention will become apparent from the following description, taken in connection with the accompanying drawings illustrating an operative embodiment of my device.

Figure 11 is a plan view of the drive bushing body.

Figure 12 is a combined elevational and sectional view of the drive bushing body, seen as though viewed on the line 12—12 of Figure 11 the bushing being threaded to receive the split guide sleeve of Figure 6.

Figure 13 is a view similar to Figure 12 illustrating a modification wherein the bore of the drive bushing body has a groove to receive a retaining ring for holding a split guide sleeve such as seen in Figure 2, in place.

Figure 14 is a plan view of the drive bushing body, showing a square lower end opening.

Figure 15 is a combined sectional and elevational view of a known type of drive bushing body, seen as though viewed on the line 15—15 of Figure 14.

Figure 16 is a plan view of one-half of the split bonnet of the drive bushing.

Figure 17 is a side view of the half bonnet, looking in the direction of arrow in Figure 16.

Figure 18 is a plan view of a set of the packing retaining segments, in their respective positions, the assemblage thereof in the drive bushing being shown in Figures 2 and 4.

Figure 19 is a combined sectional and elevational view of the packing retaining segments, seen as though viewed on the line 19—19 of Figure 18.

Figures 20, 21, 22 and 23, each are a top view of one quarter section of the drive bushing, the bonnet being removed, intended to show the various types of rollers that may be used.

The square portion 28 of the drive bushing body 42 fits in and is driven by a master bushing, located in the center of a rotary table (not shown), the table having a square recess to receive said portion. The conical portion 40 fits into a tapered bore in the master bushing.

Figure 7:
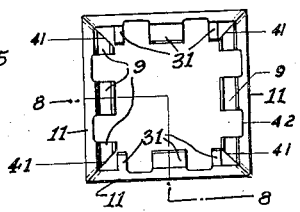
Figure 7 is a plan view of the combined liners and roller retainers as they appear when assembled within the drive bushing.
Figure 8:
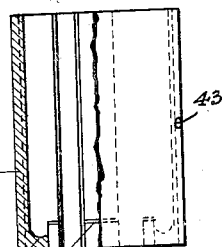
Figure 8 is a combined elevational and sectional view of the liner and retainer assemblage, seen as though taken on the line 8—8 of Figure 7.
Figures 5, 9:
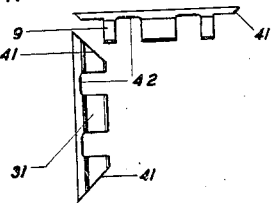
Figure 5 is a plan view of the split bottom guide sleeve, particularly showing the dovetail joints.
Figure 9 is a plan view of a pair of adjacent liners and roller retainers as seen in Figures 7 and 8, but parted from each other for better detail illustration of the diagonal parting lines.
Figure 10:
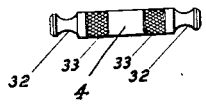
Figure 10 is a view of one of the rollers used in the assemblage in Figure 2.

Within the square bore 34 is fitted a set of four hardened steel liners 11, such as are shown in Figures 7, 8 and 9. If rollers of the type in Figure 10 are used, as is the case in the assemblage in Figure 2, the two opposite liners are provided with semi-circular roller retaining seats 9 of the same height, and the two adjacent opposite liners have similar seats 31 which are slightly higher, as required by the roller diameters and their bearing necks 32. When any one of the types of rollers 29, 36, 44 shown in Figures 20, 21 and 23 is used, the roller retaining seats will all be of the same height. The liners 11 are parted, preferably on diagonal lines 41, as shown in Figures 7 and 9.

Figure 4:
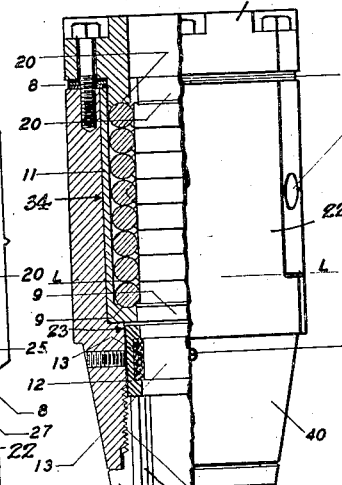
Figure 4 is a combined elevational and sectional view of assembled drive bushing seen as though taken on the line 4—4 of Figure 3, showing a modified type of anti-friction mechanism.

All of the rollers shown in Figures 20 to 23 are provided with such means on their ends as will in various ways cause the rollers to be self-retaining. When the rollers of Figures 20, 21 and 23 are used, all the four rollers in a tier operate on the same horizontal level, and the rollers in the set above rest and roll on the cylindrical surfaces of the rollers below them as seen in Figure 4. This particular roller arrangement is devised largely to provide a movable lining for the drive bushing, serving to prevent sticking of the grief rod yet providing a bearing which will have the utmost freedom of motion as in the type in Figure 2. When rollers of the type in Figure 10 are employed, only the rollers on opposite sides are on the same horizontal level, and they are also spaced from each other by virtue of the necks 32, as seen at 10 in Figure 2.

The spacing 10 is proportional to the diameter of the rollers and to the diameter of the spherical necks 32 on the ends of the rollers. The necks 32 of the rollers in one horizontal set form the bearings for the rollers in the next horizontal set as well as retainers against inward falling out of any of the rollers.

All of the above types of rollers are confined in substantially vertical series or assemblage between the seats 9, 31 on the lower ends of the liners 11 and the respectively concave and convex seats 20, 24 on the split bonnet 25 (Fig. 17). These seats are formed on means extending from the respective bonnet, said means being slidably fitted in the bushing opening. By a strict definition, the axes of the individual rollers are perpendicular to axial planes of the bushing. The foregoing bonnet is made of any one of a wide variety of metal compositions which will not spark when struck. Such a composition must be non-ferrous, and examples of compositions of this character suitable for the manufacture of the bonnet are yellow brass and gun metal. It should be understood that of these metals one is not preferable over the other any more so than either is preferable over the large list of useable non-ferrous compositions. The roller retainer seats 20, 24 on the bonnet are illustrated as being of different vertical heights suitable for use with the types of rollers in Figure 22. But the retainer seats are of equal height when the rollers seen in Figures 20, 21 and 23 are used as shown in the assemblage in Figure 4 where the type of rollers illustrated in Figure 23 is employed.

The drive bushing body 22ª of a known type shown in Figure 15 is similar to the body 22 in Figures 12 and 13, excepting that the lower bore 39 (Fig. 15) is square instead of cylindrical. The square bore 39 provides a free fit around the grief bar 2, but is too small to admit the passage of couplings 1 and 21 (Fig. 2), therefore, this type bushing (Fig. 15) is useable only when either one of the couplings 1 or 21 can be removed from the grief bar 2.

Figure 2:
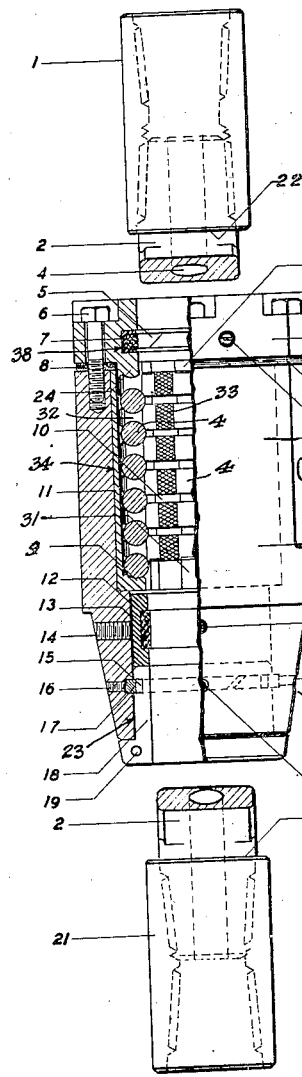
Figure 2 is a combined elevational and sectional view of assembled drive bushing, seen as though taken on the line 2—2 of Figure 1, the grief bar and its connecting couplings being shown in their place above and below the bushing and associated therewith by brackets.

Should either coupling 1 or 21 be removable from the grief bar 2 the entire previously described drive bushing may be completely assembled, as shown in Figures 2 and 4, before the grief bar is inserted within the assembled bushing, and later the couplings may be screwed on the grief bar.

Figure 6:
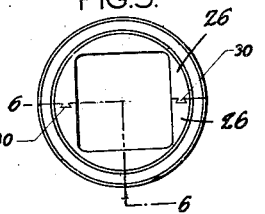
Figure 6 is a sectional view taken on the line 6—6 of Figure 5.

Usually the couplings 1 and 21 are fastened permanently to the grief bar, and when such is the case the mode of assemblage is as follows:

The couplings 1 or 21 and the grief bar 2 are put through bores 34 and 23, whereupon the halves of the split guide bushing or sleeve 26 are put on the grief bar below the bushing body 22 and the guide bushing halves then are joined together by dovetails 30 (Fig. 5). Next, a suitable length of packing, such as is shown at 13 in Figures 2 and 4, is wrapped around the grief bar and the packing retaining segments 12 of Figures 18 and 19 are pressed on the packing. The segments and the packing are then pushed into the bore 23 of the bushing body 22 as a unit, whereupon the split bushing 26 (Fig. 6) is screwed into the threaded portion 37 of the bore 23 (Figs. 4 and 12) all of the parts occupying their positions as seen in Figure 4. Thereafter, the roller retaining liners 11, seen in Figures 7, 8 and 9, are placed into the square bore 34. Rollers of the selected type are then placed between the grief bar 2 and liners 11. Next, the packing retaining segments 7 (Fig. 2) are placed in a groove 38 in the halves of the bonnet 25 (Fig. 16), said segments being filled with suitable packing material 5. The bonnet halves are fastened onto the drive bushing body 42 by cap screws 6. The concave or convex roller seats 20, 24 (depending on the type of rollers used) are spaced to a running fit on the rollers by sheet iron or other shims 8. The foregoing bores 34, 23 are of different sizes, the meeting place forming a shoulder 35 which is intended to support the sectional liners 11.

Heavy grease is then supplied to the rollers through suitable fittings or by grease cups which will be located on each corner of the drive bushing body 22 as shown in one instance at the hole 3. This hole has communication with the inside of the liners 11 through apertures 43 (Fig. 8) in the corners of assembled liners. The heavy grease will prevent metallic contact between the anti-friction rollers and the sides of the grief bar 2 and minimize the danger of igniting inflammable gases by the metallic contact or hammering which otherwise would take place between the grief bar and the rollers. The adjustment for wear of packings 13 and 5 is made by set screws 14 and 27 respectively. The adjustment of these screws also tightens the packings against the grief bar thus making a closer joint for the retention of the grease.

If the split guide sleeve 18 of Figure 2 is used, the mode of assemblage is the same as above excepting that the guide sleeve halves are aligned by dowels 19, and the guide sleeve is held in place by spring ring 17. To remove the guide sleeve 18 from the bore 23 set screws (not shown) are screwed into threaded holes 16 so as to force the ring 17 into a groove 15 in the bushing which permits the withdrawal of the sleeve 18 from the bore 23.

The packing retaining segments 7 in the bonnet may be similar to the segments 13, or they may be shaped and mitered to fit directly into the rectangular groove 38, shown in the bonnet 25 (Fig. 16). When made in this manner they will comprise rectilinear bars which when assembled at their mitered ends, form a hollow square, each bar having a packing retainer groove coming on the inner wall of the square.

Because of the fact that the grief bar 2 is immersed in the mud laden fluid contained by the well bore, the principal cleaning of the grief bar must be done by the lower packing or wiper 13, and the upper packing or wiper 5 may sometimes be omitted.

Figure 1:
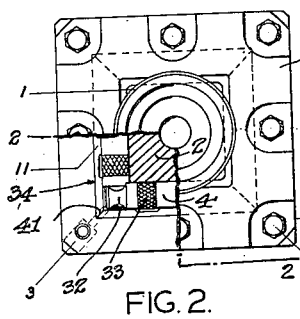
Figure 1 is a plan view of the improved drive bushing, the upper grief bar coupling being shown in place, the lower left quarter of the bonnet being removed to expose the rollers to view.
Figure 3:
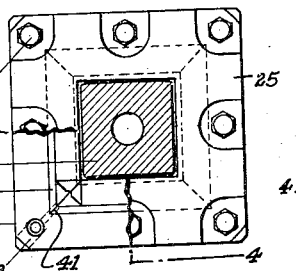
Figure 3 is a plan view of the bushing, showing grief bar in place; the lower left quarter of the bonnet being removed to expose the rollers.

When the grief bar couplings 1, 21 are permanently fastened to the grief bar 2, it is preferable that the bonnet 25 be made in equal halves as suggested in Figures 1, 3 and 16.

If either one of the couplings 1 or 21 is movable from the grief bar 2 the bonnet 25 may be made in one piece, and the guide sleeves 18 and 26 may be omitted. These sleeves, like the bonnet 25, are made of a metal composition which will not spark when struck, for examples yellow brass or gun metal, although the specification of these is not to be regarded as a limitation in any sense. Further, it is to be noted that each sleeve has a non-circular passage to receive a cross-sectionally similarly shaped grief bar.

The liners 11 are recessed at 42 (Fig. 9) to provide clearance for the knurled portions 33 of the type of roller in Figure 10. The seats 9, 31 are spaced apart (Figs. 7 and 9) the recesses occurring therebetween, said recesses being oversized (as compared with the rollers) to accommodate the knurled portions of the lowermost rollers. For plain types of rollers, the recesses 42 are not required, but may be useful in proportioning the friction surfaces of the liners 11.

When changing grief bars from one size to another, the required change of parts affects the sectional liners and rollers, the sectional guide sleeve, the bonnet and the packing retaining segments. Replacement of worn parts are made as required.

Certain structural changes and the selective use of the various types of rollers shown in Figures 20 to 23 inclusive are considered to be within the appended claims, without departing from the scope of the invention.

What I claim is:

1. In a rotary drive bushing for rotating a grief bar, said bushing having a central opening for receiving the bar; sets of rollers assembled in the opening to contact the bar, and, means integral with the rollers in interengagement, maintaining the rollers in operative position in the opening in the absence of the grief bar.

2. In a rotary drive bushing for rotating a grief bar, said bushing having a central opening for receiving the bar; sets of rollers assembled in the opening to contact the bar, means integral with the ends of the rollers mutually contacting to loosely maintain the rollers in operative position in the opening.

3. A rotary drive bushing for rotating a grief bar, and mutually engaging sets of rollers in vertical assemblage around and in contact with the grief bar to provide anti-friction mechanism, said bushing having bores of two sizes forming a shoulder on which the weight of the entire roller assemblage is commonly imposed.

4. A rotary drive bushing for rotating a grief bar, said bushing having bores of two sizes forming a shoulder, one of said bores being cross-sectionally non-circular, an assemblage of mutually contacting rollers situated in the non-circular bore, said assemblage encompassing the grief bar and being in contact therewith, liners in the bore occupied by the rollers fitting between the rollers and the walls of said bore, the cross-sectionally non-circular shape of the respective bore insuring the fixture of the liners, and seats embodied in the liners resting on the shoulder and providing supports for the roller assemblage.

5. A rotary drive bushing for rotating a grief bar, said bushing having an opening for receiving the bar, sets of rollers around the bar and in contact therewith, mutually contacting end structures integral with the rollers supporting the rollers in an upright self-sustaining assemblage, knurled portions embodied in the rollers causing turning of the rollers by the rectilinear movements of the grief bar, and means inserted in the opening containing the roller assemblage, said means including seats by which the assemblage is supported, said seats being spaced apart with oversized recesses therebetween to accommodate the knurled portions of the lowermost rollers.

6. A rotary drive bushing for rotating a grief bar, said bushing having an opening for receiving the bar, sets of rollers in contact with the bar, bearing necks on the ends of the rollers, the necks of the rollers in one set interfitting the necks of the rollers in adjacent sets thereby disposing the rollers in adjacent sets in staggered relationship and producing a self-sustaining anti-friction assemblage, liner means by which the roller assemblage is connected being fitted in the bushing opening, and seats embodied in the liner means on which the lowermost rollers of the sets are mounted to provide supports for the roller assemblage.

7. A rotary drive bushing having an opening for receiving a grief bar, a mutually engaging roller assemblage in contact with all sides of the bar, the axes of the rollers being perpendicular to longitudinal axial planes of the bushing, means inserted in the opening containing the roller assemblage, said means including seats by which the assemblage is supported in an upright position in reference to the bar, a bonnet and means to secure it to the bushing to serve as a follower for the roller assemblage, and means coacting with said securing means for making fine vertical adjustments of the bonnet and produce a running fit of the rollers.

8. A rotary drive bushing having an opening for receiving a grief bar, sets of mutually engaging rollers providing an anti-friction assemblage around the bar, confronting seat means at opposite ends of the assemblage, one of the seat means occurring in the bushing opening, a bonnet of which the other seat means is a part, said other seat means being slidably fitted in said opening, means for securing the bonnet to the bushing so that the respective seat means bears down on the roller assemblage, and a shim structure between the bonnet and bushing enabling a fine adjustment of the degree of bearing of said seat means.

9. A rotary drive bushing having an opening to to receive a grief bar, a roller assemblage consisting of sets of rollers having mutually contacting structures making the rollers interdependent for the maintenance of said assemblage, and a combined containing and supporting means for the assemblage consisting of liners fitted in said opening, said liners having seats on which the roller assemblage is mounted.

10. In a drive bushing having a portion adapted to have a driving fit in a master bushing and having an opening therethrough for receiving a grief bar, a hollow body included in said drive bushing and extending above both the master bushing and said portion which has a driving fit in said master bushing; and an interengaging assemblage of rollers occupying said hollow body.

11. A rotary drive bushing comprising mutually interengaging rollers providing an anti-friction assemblage for a grief bar, relatively thin, hardened liners of uniform thickness assembled to form a container for said assemblage, said liners having seats on which the lowermost rollers are mounted, and a bushing body of uniform thickness in the region of the liners having an opening in which the liners are assembled, the adjacent walls of said body being relatively thick to provide an ample backing for said liners.

12. A rotary drive bushing having an opening for receiving a grief bar and having a hole in communication with said opening for the introduction of a lubricant, a roller assemblage situated in the opening around the bar and working in said lubricant, and retaining means carried by the bushing above and below said assemblage, said means contacting the bar and serving to clean off the grit and retain the lubricant in said opening.

13. A rotary drive bushing having an opening to receive a grief bar and having a hole in communication with the opening for the introduction of a lubricant, a roller assemblage occupying the opening and surrounding the grief bar, a plurality of elements assembled in the opening around said bar both above and below the roller assemblage, said elements being grooved, and packing means situated in the grooves and contacting the grief bar to simultaneously clean the grief bar and retain the lubricant for localization in said grooves.

14. In a drive bushing, a portion having an opening receiving a grief bar, segments, each of which segments has a groove, said segments being assembled in the opening so that the grooves face the bar, packing means wrapped around the bar and filling the grooves, and means for adjusting the segments with respect to the bushing portion so as to vary the degree of tightening of the packing against the bar.

15. In a drive bushing, a portion having a bore, a guide sleeve fitted in part of the bore for receiving a grief bar, segments having grooves, said segments being assembled on the inner end of the sleeve around the bar so that the grooves face the bar, and packing means around the bar occupying the grooves.

16. In a drive bushing, a portion having a bore, and a guide sleeve inserted in said bore, said sleeve having a non-circular passage to receive a grief bar, said sleeve including a part extending beyond the end of said portion to provide an extended guide for the bar.

17. In a drive bushing, a portion having an opening in which a grief bar is reciprocable, a guide sleeve fitted in said opening to guide the bar, said sleeve being split into sections to enable its assemblage in the opening around the bar without separating the bar and bushing, means for aligning the sleeve sections, and means for holding the sleeve in place in the opening.

18. In a drive bushing, a portion having an opening for receiving a grief bar and having a groove in the wall of said opening, a guide sleeve fitted in the opening to guide the bar, said sleeve being split into sections to enable its assemblage in the opening without disassembling the drive bushing and bar, each of said sections having a groove, means for aligning the sections to make a continuous groove in confronting relationship with the wall of the groove, and a spring ring assuming a medial position between the wall and ring grooves to retain the ring.

19. In a drive bushing, a portion having an opening for receiving a grief bar and having a groove in the wall of said opening, a guide sleeve fitted in the opening to guide the bar, said sleeve being split into sections to enable its assemblage in the opening without disassembling the drive bushing and bar, each of said sections having a groove, means for aligning the sections to make a continuous groove in confronting relationship with the wall of the groove, a spring ring assuming a medial position between the wall and ring grooves to retain the ring, and means to compress the spring ring within the ring groove to enable extraction of the sleeve from the opening.

150

20. In a rotary drilling machine having a grief bar including a coupling permanently connected thereto; a drive bushing to drive the grief bar having a bore sufficiently larger than the cross-sectional size of the grief bar to enable moving the grief bar and its coupling completely through said bushing, and a guide ring having an opening slightly larger than the cross sectional size of the grief bar to provide a guide for the grief bar, said ring being split into sections to enable assemblage in said bore during the operation of the drive bushing.

21. In a drive bushing, a body having portions insertible in a master bushing which is of a thickness substantially equal to the height of said portions, the insertion of said portions causing the body to extend away from one surface of said bushing, said portions and body having bores extending inwardly from opposite ends, said bores meeting to provide a shoulder, an assemblage of mutually contacting rollers, and containing means for the assemblage situated in the bushing and engaging the shoulder.

22. A drive bushing having an opening for receiving a grief bar to be rotated by the bushing, said grief bar being subject to up and down movement in respect to the bushing and having couplings connected therein at opposite sides of the bushing, and members capping the opposite ends of the bushing, said members being composed of a substance preventing sparking when struck by said couplings.

23. In a drive bushing, rollers, and bearing necks on the ends of the rollers being interengageable with the corresponding bearing necks of adjacent rollers for relative turning and to form a self-sustaining assemblage.

24. In a drive bushing, rollers, and mitered end formations on the rollers making mutual contact and preventing falling in of the rollers when assembled around a grief bar.

25. In a rotary drive bushing for rotating a grief bar, said bushing having a central opening for receiving the bar; sets of rollers assembled in the opening to contact the bar, means integral with the rollers in interengagement, maintaining the rollers in operative position in the opening in the absence of the grief bar, and liner means fitted in the central opening containing and supporting said sets of rollers.

26. A rotary drive bushing for rotating a grief bar, said bushing having bores of two sizes forming a shoulder, sets of rollers in one of the bores contacting the grief bar, means integral with the ends of the rollers, said means being in interengagement and maintaining the roller sets in a loose, upright interengagement around the grief bar, and means inserted in the bore containing and supporting the rollers and in turn resting on the shoulder for support.

27. In a rotary driller table, a rotary drive bushing comprising sets of interengaging rollers providing an anti-friction assemblage for a grief bar, conical and square portions included in said drive bushing to be fitted in the master bushing of said table, and a body portion completing said bushing and being superposed on the square portion and extending upwards from the master bushing, said body having an opening occupied by said assemblage and providing an extended housing therefor, said opening merging with an opening through the square and conical portions for the reception of the grief bar.

GUSTAVUS A. MONTGOMERY.